(12) United States Patent
Woody et al.

(10) Patent No.: US 7,900,506 B2
(45) Date of Patent: *Mar. 8, 2011

(54) MULTI-DIMENSIONAL STANDING WAVE PROBE FOR MICROSCALE AND NANOSCALE MEASUREMENT, MANIPULATION, AND SURFACE MODIFICATION

(75) Inventors: Shane C. Woody, Charlotte, NC (US); Marcin B. Bauza, Charlotte, NC (US); Stuart T. Smith, Charlotte, NC (US)

(73) Assignee: Insitutec, Inc., Charlotte, NC (US)

( * ) Notice: Subject to any disclaimer, the term of this patent is extended or adjusted under 35 U.S.C. 154(b) by 594 days.

This patent is subject to a terminal disclaimer.

(21) Appl. No.: 11/956,915

(22) Filed: Dec. 14, 2007

(65) Prior Publication Data

US 2008/0202222 A1 Aug. 28, 2008

Related U.S. Application Data

(63) Continuation-in-part of application No. 11/818,669, filed on Jun. 15, 2007, now Pat. No. 7,735,358, which is a continuation-in-part of application No. 10/989,744, filed on Nov. 16, 2004, now Pat. No. 7,278,297.

(60) Provisional application No. 60/874,772, filed on Dec. 14, 2006, provisional application No. 60/931,724, filed on May 25, 2007, provisional application No. 60/813,962, filed on Jun. 15, 2006, provisional application No. 60/520,500, filed on Nov. 17, 2003.

(51) Int. Cl.
G01B 5/28 (2006.01)
G01Q 20/00 (2010.01)
G01Q 60/38 (2010.01)

(52) U.S. Cl. ............... 73/105; 850/21; 850/33; 850/40; 850/52; 850/56; 850/63

(58) Field of Classification Search ............... None
See application file for complete search history.

(56) References Cited

U.S. PATENT DOCUMENTS 6,246,054 B1 * 6/2001 Toda et al. ............... 850/1
7,278,297 B2 * 10/2007 Bauza et al. ............... 73/105

OTHER PUBLICATIONS

Shane C. Woody, Stuart T. Smith; "Resonance-based vector touch sensors"; Center for Precision Metrology; University of North Carolina at Charlotte; Corresponding author: Insitu Tec. Inc., Charlotte, NC; see front matter (C) 2003 Elsevier Inc.; Available online at www.sciencedirect.com. All rights reserved.

* cited by examiner

*Primary Examiner* — Daniel S Larkin
(74) *Attorney, Agent, or Firm* — Clements Bernard PLLC; Christopher L. Bernard; Lawrence A. Baratta Jr.

(57) ABSTRACT

The present invention provides a multi-dimensional standing wave probe for microscale and nanoscale measurement, manipulation, and surface modification, including: a filament having a first free end and a second end that is attached to at least one actuator to apply oscillation cycles to the filament; wherein the oscillation of the filament during at least one complete cycle of oscillation of the actuator causes the free end to move in a multi-dimensional envelope, producing a defined virtual probe tip at the free end, wherein a shape of the virtual probe tip is defined by both a characteristic shape of the oscillation of the free end and a geometry of the filament. Optionally, the actuator includes a monolithic crystal actuator. Preferably, the monolithic crystal actuator includes a crystal having zero grain boundaries. The monolithic crystal actuator also includes a plurality of thin flexure structures. The monolithic crystal actuator further includes a plurality of metallic electrodes disposed on inside or outside surfaces, or a combination thereof, of the plurality of thin flexure structures.

18 Claims, 5 Drawing Sheets

MULTI-DIMENSIONAL STANDING WAVE PROBE FOR MICROSCALE AND NANOSCALE MEASUREMENT, MANIPULATION, AND SURFACE MODIFICATION

CROSS-REFERENCE TO RELATED APPLICATIONS

The present non-provisional patent application claims the benefit of priority of U.S. Provisional Patent Application Nos. 60/874,772, filed on Dec. 14, 2006, and entitled "MULTI-DIMENSIONAL STANDING WAVE SENSOR WITH AN APPLICATION TO DIESEL MANUFACTURING" and 60/931,724, filed on May 25, 2007, and entitled "STANDING WAVE PROBES FOR MEASUREMENT, MANIPULATION, AND MODIFICATION ACROSS DIMENSIONAL SCALES," the contents of both of which are incorporated in full by reference herein. The present non-provisional patent application is a continuation-in-part of U.S. patent application Ser. No. 11/818,669 now U.S. Pat. No. 7,735,358), filed on Jun. 15, 2007, and entitled "SELF-SENSING TWEEZER DEVICES AND ASSOCIATED METHODS FOR MICRO AND NANO-SCALE MANIPULATION AND ASSEMBLY," which claims the benefit of priority of U.S. Provisional Patent Application Nos. 60/813,962, filed on Jun. 15, 2006, and entitled "SELF-SENSING TWEEZERS FOR MICRO-ASSEMBLY AND MANIPULATION" and 60/931,724, filed on May 25, 2007, and entitled "STANDING WAVE PROBES FOR MEASUREMENT, MANIPULATION, AND MODIFICATION ACROSS DIMENSIONAL SCALES," the contents of all of which are incorporated in full by reference herein. U.S. patent application Ser. No. 11/818,669 is a continuation-in-part of U.S. patent application Ser. No. 10/989,744 (now U.S. Pat. No. 7,278,297), filed on Nov. 16, 2004, and entitled "AN OSCILLATING PROBE WITH A VIRTUAL PROBE TIP," which claims the benefit of priority of U.S. Provisional Patent Application No. 60/520,500, filed on Nov. 17, 2003, and entitled "AN OSCILLATING PROBE WITH A VIRTUAL PROBE TIP," the contents of both of which are incorporated in full by reference herein.

FIELD OF THE INVENTION

The present invention relates generally to the microscale and nanoscale technology fields. More specifically, the present invention relates to a multi-dimensional standing wave probe for microscale and nanoscale measurement, manipulation, and surface modification.

BACKGROUND OF THE INVENTION

There is an immediate need for a multi-dimensional metrology probe that operates on microscale and nanoscale levels. Precision metrology is the primary barrier to fully realizing many applications at such scales. Essentially, the inability to measure microscale and nanoscale features leads to the inability to understand and improve process behaviors in this area and stifles innovation. The technological barriers to achieving these goals for probes in this area are enabling multi-dimensional precision metrology on microscale and nanoscale levels, performing high-aspect ratio measurements, accounting for scaling effects (i.e. attaching microspheres or nanospheres to shafts for multi-dimensional measurements), enabling sufficiently high scanning speeds, and overcoming attraction forces, such as adhesion forces, meniscus forces, and electrostatic forces.

Micromanipulation is another area of importance, the main technological challenge being the ability to reliably pick and place very small objects. Essentially, the objects are attracted to the tweezers and are difficult to release. Multiple probe tips may be used to grip a specimen, and by energizing these probe tips, the dynamic forces created may be employed to reliably release the specimen. Preferably, having sensing capability, the probe "knows" when the specimen has been released. In such a manner, the micromanipulator serves as self-sensing tweezers that may be used in a wide variety of applications. For example, biologists may probe a cellular structure with the micromanipulator and force feedback signals may be transferred to larger forces in a virtual glove or the like. This is referred to as "haptic rendering" and may lead to new discoveries by providing biologists with real-time feedback to "touch, feel, and diagnose" cellular and intracellular structures.

Ideally, by incorporating contact mode force sensing, position control, and controllable contact forces, probes may also be used for performing microscale and nanoscale surface modification. This would be useful across a wide range of disciplines. For microassembly, it would be possible to fit very small components together, improve critical dimensional accuracies, and/or generate tribologically-functional surfaces. Localized surface engineering would be possible. An example might be the creation of high-aspect ratio pits for microfluidic or biological sample location. Other applications might be the generation of controlled holes in membranes and/or the thinning of various structures for electronic and/or thermal studies.

Thus, the importance of the development of multi-dimensional metrology probes that operate on microscale and nanoscale levels is readily apparent and such a suitable technological platform is lacking in the art.

BRIEF SUMMARY OF THE INVENTION

In various exemplary embodiments, the present invention provides a technological platform that strategically enables a vast array of functionalities to be fully realized on both microscale and nanoscale levels; ranging from high-aspect ratio multi-dimensional metrology, to self-sensing tweezers for assembly and haptic rendering, to surface modification. Encompassed within this technological platform are geometrical scaling processes involving high-aspect ratio filaments, microresonators, controller technologies, and small-scale volume metrology integration processes. The unique nature of the multi-dimensional standing wave probe of the present invention provides a tool that may be utilized in a wide variety of applications spanning a wide variety of disciplines.

In one exemplary embodiment of the present invention, a multi-dimensional standing wave probe for microscale and nanoscale measurement, manipulation, and surface modification includes: a filament having a first free end and a second end that is attached to at least one actuator to apply oscillation cycles to the filament; wherein the oscillation of the filament during at least one complete cycle of oscillation of the actuator causes the free end to move in a multi-dimensional envelope, producing a defined virtual probe tip at the free end, wherein a shape of the virtual probe tip is defined by both a characteristic shape of the oscillation of the free end and a geometry of the filament. Optionally, the actuator includes a monolithic crystal actuator. Preferably, the monolithic crystal actuator includes a crystal having zero grain boundaries. The monolithic crystal actuator also includes a plurality of thin flexure structures. The monolithic crystal actuator further includes a plurality of metallic electrodes disposed on inside or outside surfaces, or a combination thereof, of the plurality of thin flexure structures.

In another exemplary embodiment of the present invention, a method for providing a multi-dimensional standing wave probe for microscale and nanoscale measurement, manipulation, and surface modification includes: providing a filament having a first free end and a second end that is attached to at least one actuator to apply oscillation cycles to the filament; wherein the oscillation of the filament during at least one complete cycle of oscillation of the actuator causes the free end to move in a multi-dimensional envelope, producing a defined virtual probe tip at the free end, wherein a shape of the virtual probe tip is defined by both a characteristic shape of the oscillation of the free end and a geometry of the filament. Optionally, the actuator includes a monolithic crystal actuator. Preferably, the monolithic crystal actuator includes a crystal having zero grain boundaries. The monolithic crystal actuator also includes a plurality of thin flexure structures. The monolithic crystal actuator further includes a plurality of metallic electrodes disposed on inside or outside surfaces, or a combination thereof, of the plurality of thin flexure structures.

In a further exemplary embodiment of the present invention, a multi-dimensional standing wave probe for microscale and nanoscale measurement, manipulation, and surface modification, includes: a filament having a first constrained end and a second end that is attached to at least one actuator to apply oscillation cycles to the filament; wherein the oscillation of the filament during at least one complete cycle of oscillation of the actuator causes the filament to move in a multi-dimensional envelope, producing a defined virtual probe, wherein a shape of the virtual probe is defined by both a characteristic shape of the oscillation of the filament and a geometry of the filament.

BRIEF DESCRIPTION OF THE DRAWINGS

The present invention is illustrated and described herein with reference to the various drawings, in which like reference numbers are used to denote like system components/ method steps, as appropriate, and in which.

DETAILED DESCRIPTION OF THE INVENTION

Figure 1:
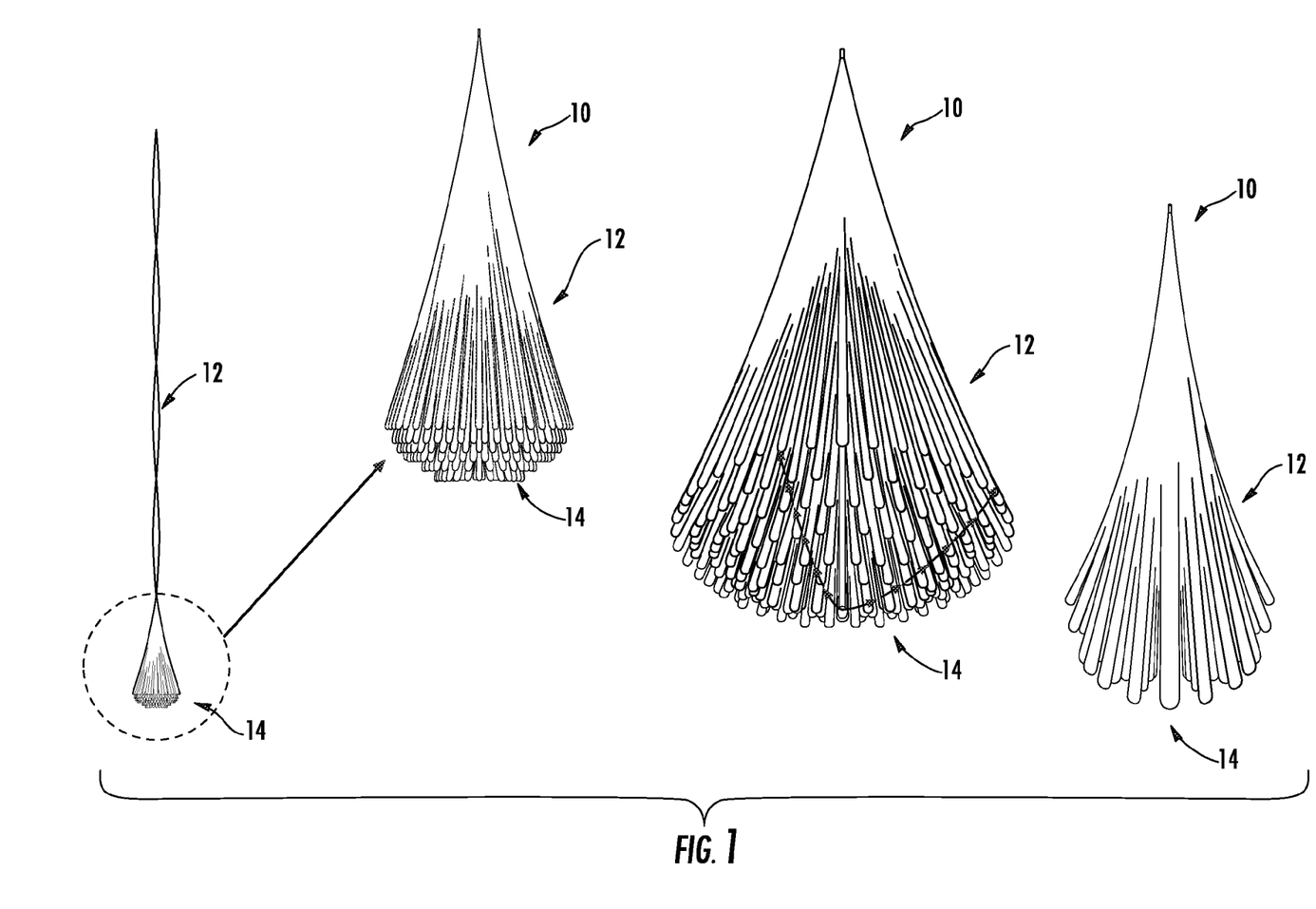
FIG. 1 is a series of schematic diagrams illustrating one exemplary embodiment of a multi-dimensional standing wave sensor incorporating a microscale or nanoscale filament in accordance with the systems and methods of the present invention.

In various exemplary embodiments, the present invention provides a multi-dimensional standing wave sensor. This technological platform is capable of operating as a combined sensor for detecting surface contact (physical or non-physical), self-sensing tweezers for gripping and releasing a component, ultrasonic tip for fluidics, and energy source for performing surface modification, all on a microscale or nanoscale. Multi-dimensional standing waves are propagated at a rate on the order of kHz to MHz along a high-aspect ratio microscale or nanoscale filament, as is illustrated in FIG. 1 which depicts a multi-dimensional standing wave sensor 10 incorporating such a microscale or nanoscale filament 12. The magnitude of energy contained within the "wave packet" compared to the flexibility/stiffness of the filament 12 enable a pronounced multi-dimensional standing wave to be generated and sustained along the filament 12. The "wave packet" is defined as an envelope containing an arbitrary number of waveforms which have a specific position and momentum. As a result of the periodic energy transferred to the high-aspect ratio filament 12, the combined energy arriving at and reflecting from the tip 14 of the filament 12 generates multi-dimensional geometrical patterns (such as hemispheres, ellipsoids, and other Lissajous-type shapes). The shape of the tip 14, referred to as a "virtual tip," may be changed, wherein programmability is a function of the synchronization, magnitude, and modal shapes produced by the standing waves.

A time averaged picture of the oscillating filament 12 produces an image of the oscillating probe 10 as a solid volume traced out by the path of the outer surface of the filament 12 that has a defined geometrical pattern. The probe 10 is comprised of the filament 12; however, the virtual tip is comprised of an integral of the path produced by the tip 14. The outer locus of the virtual tip is comprised of the total sum of motion produced by the very end of the filament 12, thereby generating a pseudo field capable of interacting with other solids and surfaces in near proximity. This programmable pseudo field (i.e. the virtual tip) may be employed across a wide variety of applications ranging from measurement to manipulation to, at higher energies, surface modification.

The filament 12 is mechanically coupled to a microresonating device (illustrated and described in greater detail herein below) providing two or more axes of resonance. Resonant frequencies generated by the microstructure are exploited to drive controllable amounts of energy into the filament 12. Conventional sensing elements, such as capacitive or piezoresistive plates, are incorporated to monitor the real-time motion of the microstructure while subject to periodic excitation. Different resonating modes represent independently different sensing abilities. For example, a simplified cantilever beam contains two lateral vibration modes and one longitudinal vibration mode, collectively representing three orthogonal axes having independently different sensitivities. A multi-dimensional resonating body may be exploited as a multi-dimensional working sensor capable of detecting the magnitude and direction of force from a single point of contact. Thus, the standing wave sensor 10 is capable of detecting and measuring surface interactions in multiple dimensions, with a probe geometry that is characterized by the shape of the virtual tip.

As used herein, the terms "sensor," "probe," and the like are used interchangeably and may imply devices that are actuated and may or may not provide sensing capability, depending upon the specific application involved. It should also be noted that multiple "probes" may be employed in pick and place applications and the like.

Many emerging micromanufacturing and nanomanufacturing systems must integrate functionality across multiple dimensional scales (bio-microelectromechanical systems (bio-MEMS) microfluidic systems, and nanofluidic systems, for example). The complexity of these systems requires that each layer is designed and integrated seamlessly. Thus, many technological barriers must be overcome in the areas of metrology/measurement, manipulation, and surface modification. Related to metrology/measurement, issues are present related to high-aspect ratio measurements on microscale and nanoscale levels, high-throughput scanning, traceable standards, attraction forces, and the complexity of integrating and analyzing large arrays of micromachines. Related to manipulation, specimens tend to stick to micromanipulators and are difficult to pick and place, force feedback and dimensional measurement capability are lacking, and existing processes are very slow. Related to surface modification, thresholds must be determined as a function of both material and scale, energetics vary with scale, and material removal efficiency and precision of shape must be optimized.

Fundamentally, technologies are available with accuracies and precisions extending to sub-nanometer scales. For these technologies to be realized in macroscale machines, however, it is currently necessary to operate in temperature and vibration controlled laboratories. The major technological barriers are the coupling between these macroscale metrology tools for characterizing sensors in smaller translation control platforms operating in relatively small volumes. In order to provide standing wave probes 10 as a metrology tool, it is necessary that the performance is characterized with uncertainties considerably better.

True multi-dimensional metrology is currently nonexistent in microscale and nanoscale applications. Conventional CMM accommodates larger workpiece features on the order of 1.0 mm or greater. Many technologies, such as SEM and SPM, are considered two-and-a-half-dimensional measurement devices. Many of these technologies fall short when attempting to measure high aspect ratios. For example, SPM cannot measure greater than 10:1 aspect ratios and none of the technologies can measure 100:1 aspect ratios or greater. On a larger scale, measurement of high-aspect ratio features, such as holes, is performed by scanning the workpiece cross section (i.e. by dissection), which is destructive and may distort the measured surface of the workpiece.

CMMs are used for dimensional metrology and are one of the only traceable methods providing true multi-dimensional measurement capability. The state of the art in CMM techniques for microscale component geometries typically employs touch triggering (i.e. intermittent contact) or scanning as the contact interaction-based measurement technique. Each of these methods uses a probe tip with an attached sphere as a reference for workpiece measurement, making it difficult or even impossible to measure microscale features. In recent years, a number of sub-millimeter probe tip designs and methodologies have been developed. However, many very small multi-dimensional structures require probe tip contact diameters of only a few micrometers in size to provide the capability to resolve very small spatial features. Current manufacturing processes for macroscale probes cannot be scaled down to microscales and nanoscales. Additionally, adhesive and other interactions between the workpiece and contacting probe tip at the nanometer and micrometer-feature level are prohibitively significant. These adhesion forces reduce the accuracy and repeatability of conventional microscale scanning probes. Correspondingly, at such scales, the related frictional forces introduce uncertainties due to structural distortions caused by interactions between the probe tip and workpiece surface. Moreover, contact forces of many of these touch probes are often greater than 1 µN and, for small probe tip radii, may elastically or even plastically deform the measured surface.

Alternatively, for imaging and measurement at microscale and nanoscale levels, researchers and industry currently use tools such as optical microscopes, atomic force microscopes (AFMs), scanning electron microscopes (SEMs), transmission electron microscopes (TEMS), and scanning probe microscopes (SPMs). These tools fall into three categories: scanning probe-based, beam-based, and photon-based. SPMs typically employ probe tips of various shapes attached to short beams that limit the geometry of the features that can be probed. A large number of the conventional probes are sensed using optical reflection from their back faces, thereby fundamentally limiting the suitable scale to greater than the Airey disk and requiring line-of-sight to the back sides of the probes. In recent efforts to overcome this, researchers have added a carbon nanotube to the end of an AFM tip or grown very thin tips using the electron beam of an SEM. However, the shank lengths are only in the realm of few micrometers long and are not suitable for use with high-aspect ratio microscale holes, such as diesel injector holes with depths of about 1 to 3 millimeters. Additionally, the SEM is a useful tool for surface imaging, but is considered to be two-and-a-half-dimensional and requires a vacuum environment.

None of these solutions provide the capability to rapidly and accurately measure high-aspect ratio microscale features across multi-dimensional scales. Microscale CMM probing techniques continue to attempt to adapt traditional macroscale probes scaled down to microscale sizes. Existing strategies have fallen short of bridging the gap between microscale and nanoscale dimensional metrology. Current techniques are plagued by slow measurement speeds, susceptibility to surface interactions, and some techniques can elastically or even plastically deform the measured surfaces. The multi-dimensional standing wave methodology of the present invention overcomes these deficiencies.

Barriers to a successful microscale and nanoscale pick and place instruments are predominantly those of overcoming adhesion forces. When picking up a very small component, it is necessary to overcome its adhesion to the substrate on which it is placed. If, for example, the component is laying on a substrate of similar or chemically-compatible material (i.e. a material that would form a thermodynamically stable alloy), there may be a diffusion-driven adhesion that must be broken. This requires sufficient energy from the probe(s). In order to release the component, it is necessary to utilize dynamic forces or multi-probe interactions. Potential microscale and nanoscale pick and place applications include, but are not limited to, micromachines for microsurgery, medical implantation, and microbiology; defense applications, including the assembly of surveillance and weapon components; fiber optic alignment; the assembly of microfluidic devices for protein and DNA studies, and the assembly of MEMS devices for sensing and actuation. The challenges presented include the presence of adhesion forces between specimen and micromanipulator; the lack of force feedback for the sensing, clamping, and releasing of specimens; scalability; the lack of high-aspect ratio tweezers for maneuvering samples into challenging features on a very small scale; the lack of dimensional measurement capability; the need for more robust mechanisms; and the lack of quantitative models of specimen/micromanipulator interactions.

Surface modification is the third component presently involved. The tip of the filament 12 of the present invention may be shaped to geometries optimized for the removal of material from soft tissues (i.e. cells) or other materials (i.e. aerogels, coatings, membranes, semiconductors, wires, etc.). The parameter governing this functionality is the energy transfer from the probe to the specimen. For the purpose of surface modification, it is necessary that this energy matches or exceeds that of the resilience (i.e. the elastic energy storage capacity) of the materials in the region of the contact. The identification of the surface modification threshold provides complimentary information whereby the probe energy may be selected for damage-free manipulation or optimization of surface modification efficiencies.

The systems and methods of the present invention utilize multi-dimensional resonant frequencies to create a multi-dimensional virtual tip on the end of a high-aspect ratio filament. This approach is unique because it vibrates high-aspect ratio filaments, fibers, beams, or rods for the specific purpose of creating a multi-dimensional virtual tip. The natural frequencies are driven in two and three orthogonal directions (i.e. XYZ) in order to enable a multi-dimensional virtual tip. Each resonant frequency is designed with high Q values exceeding about 1,000, for example. This provides a source of high energy for the filament. The microresonator bodies have sensing capability in order to monitor the mechanical response of the microstructure during vibration. The microresonators are driven and detected by any of several available means, such as piezoelectric or electrostatic comb drives.

Figure 2:
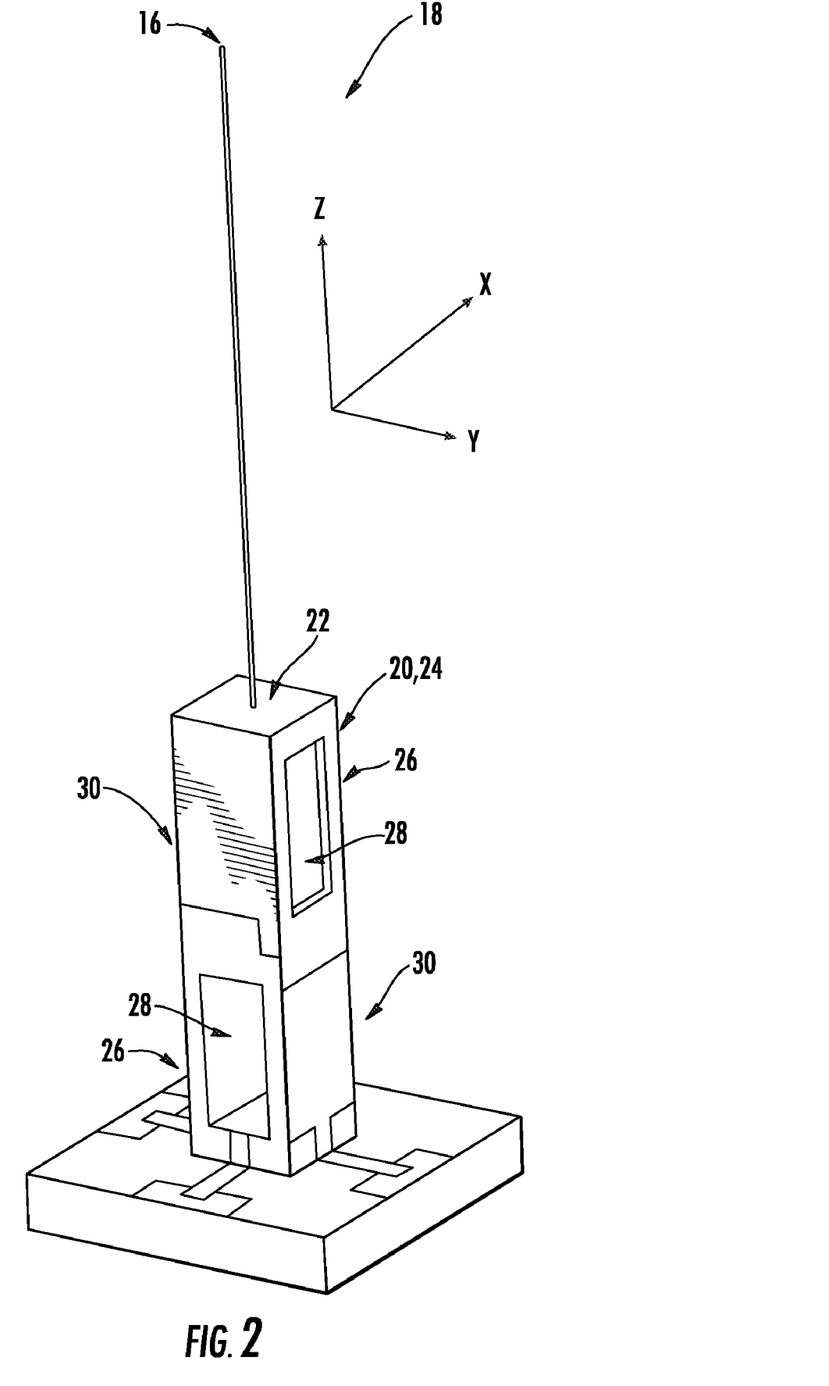
FIG. 2 is a perspective view of one exemplary embodiment of a microresonator in accordance with the systems and methods of the present invention.

Consider FIG. 2 wherein a carbon fiber 16 is oriented along the Z-axis 18 and is rigidly attached to a mechanical structure 20 through a small microscale hole 22. The mechanical structure 20 is configured from a piezoelectric single crystal 24 having zero grain boundaries, for example. An excimer laser or other micromachining process is employed to fabricate two pairs of thin webs 26, or thin leaf flexures, that are orthogonally disposed about the mechanical structure 20. The thin webs 26 serve to provide mechanical compliance about the X and Y-axes. Metallic electrodes 28 are deposited on the inside of the thin leaf flexures 26, serving as a ground potential. A metallic electrode 30 is deposited on the outside of the thin leaf flexures 26 along the X-axis to which a voltage is applied to serve as the actuator, while another metallic electrode 30 is deposited on the opposite side and serves as the sensor. A similar configuration is utilized along the Y-axis. The outside surfaces of the deposited metallic electrodes 30 are soldered to electrical wires and connected to PLL circuits. The compliance of the "ceramic" thin leaf flexures 26 allows for the design of X and Y-mechanisms with the same lateral frequency, or the lateral frequency between each axis may be varied by changing the free length or thickness of the thin web 26. Driving the actuator at the mechanical structure's resonance causes a significant increase in the signal from the PZT sensor. At a resonance mode, the carbon fiber 16 produces a standing wave response.

The objective for phase lock loop (PLL) circuit is to keep the overall system locked into a constant resonant frequency and measure the change in amplitude between the input and output signals to/from the PZT plates and the phase response. Alternatively, phase may be locked and frequency may be tracked and measured. The amount of amplitude change corresponds directly to both the magnitude of the force being contacted against the probe tip and the direction of the force contacted. For example, oscillating laterally along the X-axis causes the greatest sensitivity when a force is applied normal to the direction of oscillation. Essentially, applying a force along the Y-axis yields significantly less signal sensitivity as compared to applying a force along the X-axis. This strategy is extended to multi-dimensional detection by employing two or more resonant frequencies. For example, PZT actuators located along the X and Y-axes are simultaneously driven at a particular resonating mode, thus obtaining a third sensitive axis acting along the longitudinal direction. This methodology is referred to as vector touch sensing (VTS). It is used herein in combination with standing wave sensors to detect and decouple multi-dimensional features. It should be noted that, as an alternative to the above, conventional lock in amplifiers available from a number of sources may also be utilized.

Figure 3:
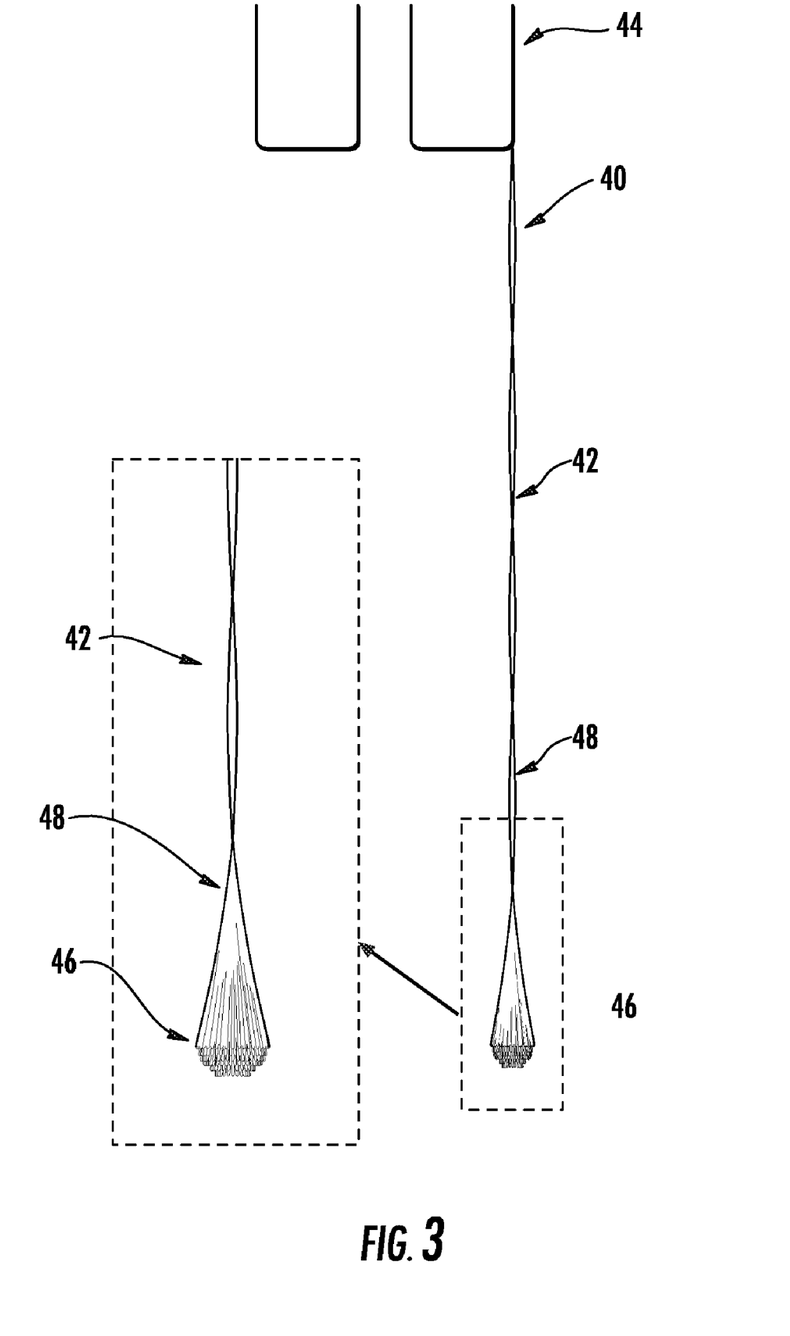
FIG. 3 is a series of schematic diagrams illustrating one exemplary embodiment of a one-dimensional standing wave sensor incorporating a microscale or nanoscale filament in accordance with the systems and methods of the present invention.

FIG. 3 illustrates one exemplary embodiment of a one-dimensional standing wave sensor 40 incorporating a microscale or nanoscale filament 42 in accordance with the systems and methods of the present invention. The free length of the filament 42 is about 5 mm and its shank diameter is about 7.5 µm. The fixed end of this rod 42 is attached to one tine of a tuning fork crystal oscillator 44. The input signal to the tuning fork 44 is an AC frequency close to the resonant frequency of the tuning fork 44, which vibrates the tuning fork 44 and creates a standing wave in the rod 42. The free end moves the greatest distance laterally as compared to any other location along the rod 42, providing a method by which the tip 46 will contact a specimen before the shank 48. As a result, there is no need to attach an optional microsphere on the end, and, moreover, the contact interaction is defined as a function of the stylus radius; in this case 3.5 µm. The input signal parameters, amplitude, frequency, and phase, are adjustable—providing a programmable oscillation amplitude at the free end ranging from a few micrometers up to several tens of micrometers.

The oscillating shank 48 stores enough energy to overcome adhesive interactions and does not stick to the surface being measured. The ability to overcome these adhesion forces enables higher precision measurements, as well as the ability to continuously scan surfaces. Advantageously, the high-aspect ratio rod 42 causes minimal damage during collisions. Because of the rod's small diameter and long length, it is very compliant in the lateral direction (i.e. the direction in which collision typically occurs).

Preferably, the complete instrument's volume is representative of the part being measured. For example, a conventional instrument's footprint measuring microcomponents often exceeds 8-9 orders of magnitude in volume as compared to the part being measured, which leads to relatively slow speeds and significant unit costs.

Figure 4:
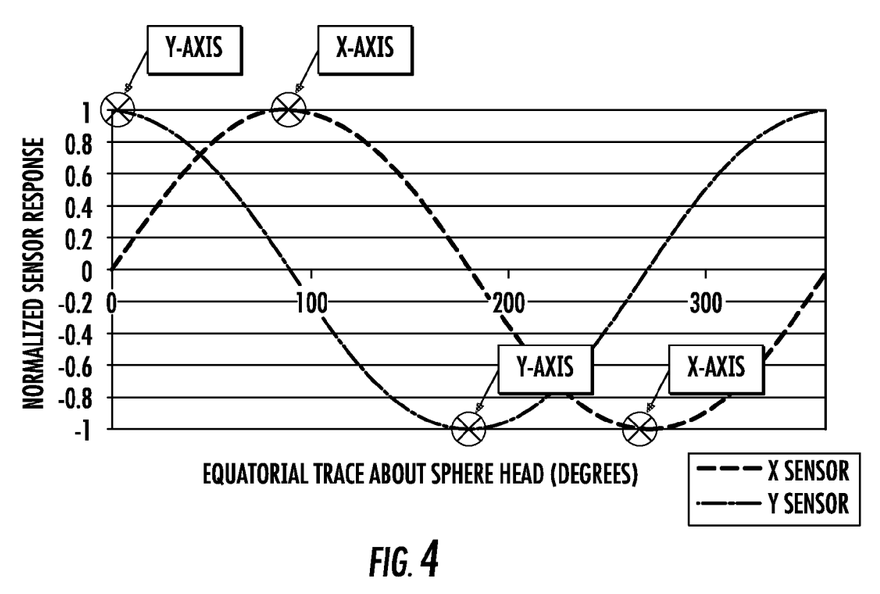
FIG. 4 is a series of schematic diagrams and a graph extending the concepts of FIG. 3 to a multi-dimensional case in accordance with the systems and methods of the present invention.

Referring to FIG. 4, and extending these concepts to a multi-dimensional case, a solid cantilever body 50 is attached with PZT plates 52 serving as actuator and sensors. The sensitivity of each axis is obtained by actuating and detecting a resonant frequency along the principal axis. Consider a contact force directed towards the center of the sphere 54 and lying in the X-Y plane. For a constant applied force, the response from the sensor in the X-axis is greatest when force is directed in the X-axis and least when force is perpendicular to the X-axis. This also applies to the second lateral axis, Y, only the directional sensitivity is orthogonal to the X-axis. In this case, a constant applied force traced about the equatorial plane of the sphere 54 results in two signals sinusoidally varying from minimum to maximum amplitudes each phase shifted with respect to the other by 90 degrees. Thus, an algorithm may be established from the experimental data to trigger at constant applied force. Therefore, the magnitude of the contact force can be calculated. Essentially, it is this value that is used in a CMM controller to determine either a trigger level or constant force set-point for touch triggering or scanning, respectively.

The direction of applied force is determined at a fixed RMS value. Each signal is dependent upon the direction of the applied force about the sphere's equatorial plane, α, and the triggering force, $F_{2D}$. When triggering at set force, the contact angle can be readily computed from the inverse tangent of the two sensor signals. A similar strategy is derived for multi-dimensional measurements by employing a third resonating axis along the Z-axis direction.

The microresonator of the present invention resonates in multi-dimensions corresponding to two lateral modes and one longitudinal mode directed into the filament. The axis' frequency, magnitude, and phase contribute in directing and geometrically shaping the virtual probe tip. This requires high Q factors to be fabricated per axis, where the half-width for each pole is desirably around 5-10 Hz, thereby enabling multiple resonances to be closely spaced along the frequency spectrum. This minimizes cross-talk behavior in the feedback signals and closely-spaced drive frequencies ensure that the nominal shape of each standing wave is maintained at one mode.

The standing wave probes of the present invention may be operated in several different ways or modes to drive the generation of a wide variety of geometric shapes. Two exemplary modes, which may be used in combination, are presented here: Mode I (linearly-driven mode) or Mode II (rotationally-driven mode). Mode I operation is defined as generating a sensor with a linear-driven standing wave with the capability to change oscillation directions at a programmable angle. Driving the actuator along the Y-axis at a natural frequency of the mechanical structure yields a standing wave along the Y-axis. However, to probe a surface orientated at 90 degrees would require the standing wave to oscillate in the orthogonal direction, which is along the X-axis. In this manner, the Y-axis actuator is shut off and the X-axis actuator is driven. At this point, a standing wave is generated in the filament along the X-axis, thereby enabling an orthogonal surface to be detected. Extending this approach further, a directionally-driven oscillation may be programmed at different angles by simultaneously driving both actuators. Equations (10) and (11) show one way to drive signals for both Y and X-axes actuators:

$$Y = A\cos(\overline{\omega}t) = R\cos\theta\cos(\overline{\omega}t);$$

$$X = B\sin(\overline{\omega}t) = R\sin\theta\sin(\overline{\omega}t).$$

In these equations, R is the amplitude drive signal, $\theta$ is the angular direction of oscillation (i.e. relative to the X and Y oscillating axes), and $\omega$ is the oscillating drive frequency corresponding to the natural frequency. The advantage of this is that the standing wave continues to be used as a one-dimensional oscillating sensor. However, employing two oscillations with the same natural frequency enables the ability to change directions as defined by the input signals in the equations. Consider the example of a surface profile. As the probe traverses across a contoured shape, the standing wave is programmed to remain normal to the surface. Previously, this was not possible without the addition of the second resonating frequency. As a result of these two lateral frequencies, this provides the ability to use both the information of the angle $\theta$ and the collinear path of the standing wave. As a result of these two variables, the capability to detect the surface slope is provided. This is known as vector touch sensing (VTS).

The ability to change the direction of the oscillations may then be extended a step further to generate a virtual hemisphere. Assuming that, when the actuator is shut off, the rate of decay is sufficiently fast, one may index from 0-80 degrees in small increments and therefore generate a virtual hemisphere (or a partial virtual hemisphere, depending on the amplitude of vibration with respect to the tip diameter). Therefore, changing the $\theta$ index provides the capability to setup a probe tip which covers and creates a hemisphere or partial hemisphere.

Mode II is defined by driving both axes at different oscillating frequencies such that a circular rotational standing wave is setup in the filament. Designing the mechanism with two different and orthogonally disposed lateral frequencies provides a method to have two directions with two distinct sensors. For example, the Y-axis could be designed with a 40 kHz natural frequency while the X-axis could be designed with a 30 kHz natural frequency. Operating both frequencies at the same time causes both directions to simultaneously oscillate. As a result, the standing wave generates a circular oscillation which rotates about the Z-axis direction.

However, with a rotationally-directional standing wave, tangential forces are present between the probe tip and measurement surface. There are characteristics observed with standing waves that may be applied towards this new operating mode. For example, it has been observed that a change in signal may be detected when the probe tip is in close proximity (i.e. less than 1 micrometer) to the sampled surface. This non-contact phenomena is the result of squeeze film damping being generated between the standing wave tip and surface.

Figure 5:
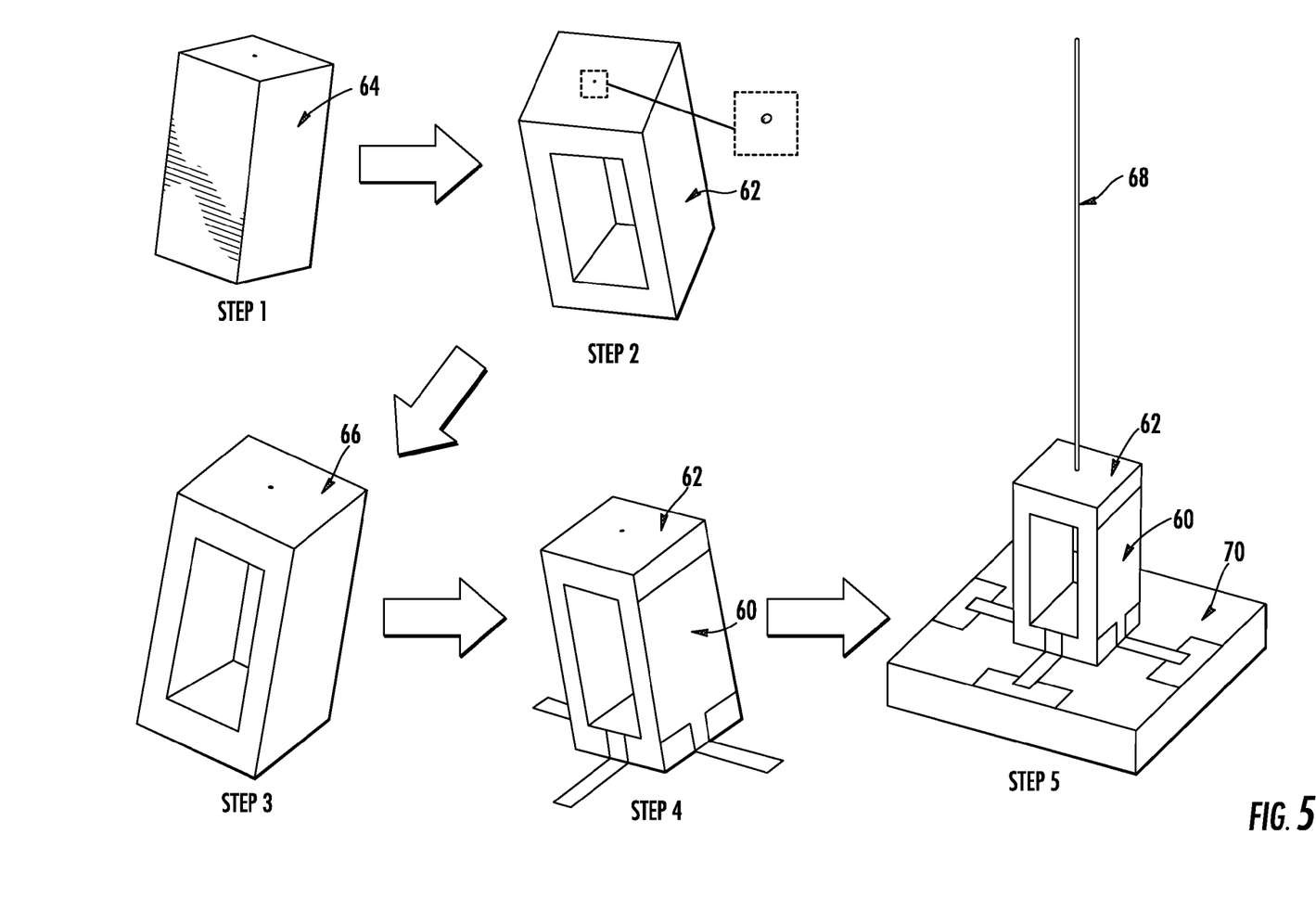
FIG. 5 is a series of perspective views of one exemplary embodiment of a process for fabricating a monolithic crystal actuator (MOCA) in accordance with the systems and methods of the present invention.

The present invention contemplates the use of actuators to set up resonating frequencies in the high-aspect ratio filaments. Various resonators may be used including electrostatic MEMS and piezoelectric actuators. In particular, a novel actuator referred to as a "monolithic crystal actuator" (MOCA) is contemplated. Currently, microscale actuators cannot be fabricated completely from PZT ceramic due to size limitations as a result of grain boundaries. In recent years, piezoelectric MEMS (i.e. wherein a thin layer of piezoelectric material is coated onto silicon) have been explored for resonators. The single crystal silicon has zero grain boundaries, thus enabling microfeatures to be fashioned into a monolithic substrate. Referring to FIG. 5, generally for an exemplary one-dimensional case, PZT electrodes 60 are deposited and segmented onto a flexure-based silicon structure 62. More specifically, a single crystal block 64 is fabricated using an excimer laser or the like, the part is then spun in a vapor deposition process and coated with a metallic layer 66, an etching or laser process is subsequently used to remove material and segment the electrodes 60. A filament 68 and base 70 are also attached. Once a voltage is applied, the PZT layer is expanded, causing the flexure mechanism to displace—enabling both static and resonant behavior. The static mode results in corresponding displacement in the actuator. Therefore, the resonance signal may be superimposed onto the static displacement signal (by stacking or otherwise) to enable both positioning and resonating the sensor.

The present invention also contemplates the use of a single crystal piezoelectric (PZN-PT) material having zero grain boundaries, and fabrication processes including excimer laser micromachining, vapor deposition, and microwire bonding to create complex multiaxis resonating structures. Recent advances in PZN-PT exhibit high strain energy densities (i.e. a factor of 2 improvement over PZT), high displacements (i.e. a factor of 5 improvement over PZT), and high electromechanical coupling leading to correspondingly high Q. As described above, a multi-step fabrication process is used.

Control of standing wave oscillations operating in multiple directions over broad bandwidths is challenging to achieve, requiring synchronization of each drive signal with nanosecond timing, high-speed phase lock loops, successfully decoupling sensing, and measurement signal characteristics. The distinct advantage of a digital approach is the ability to incorporate decision-based algorithms with the sensing and actuation signal. Thus, high-speed digital controllers may be used in conjunction with the systems and methods of the present invention. Once a signal is transferred to a high-speed digital controller, for example, the identified controller operates with 2.2 GS/s or greater processor speeds. Also contemplated are cards using field programmable gate arrays (FPGAs) which operate with parallel processing. In general, controller strategies are implemented to counteract nonlinear responses in the standing waves as a result of contact interactions in real time.

It is again important to note that the sensor's attributes, which include multiresonating capabilities and high-inertia energy, enable a vast array of science and emerging markets to be fully realized—including, but not limited to, miniature measuring machines in mass arrays during production cycles, nano-EDM machines, self-sensing tweezers serving as microassembly and haptic devices, and surface modification. Of particular note, the sensor of the present invention can be used in microfluidic applications as a micromixer or trapping device to attract and trap microscale and nanoscale particles, and even cells, as well as other such exotic uses.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A multi-dimensional standing wave probe for microscale and nanoscale measurement, manipulation, and surface modification, comprising: a filament having a first free end and a second end that is attached to at least one actuator to apply oscillation cycles to the filament; wherein the oscillation of the filament during at least one complete cycle of oscillation of the actuator causes the free end to move in a multi-dimensional envelope, producing a defined virtual probe tip at the free end, wherein a shape of the virtual probe tip is defined by both a characteristic shape of the oscillation of the free end and a geometry of the filament.

2. The multi-dimensional standing wave probe of claim 1, wherein the multi-dimensional standing wave probe is operated in one of a linearly-driven mode, a rotationally-driven mode, and a combination thereof.

3. The multi-dimensional standing wave probe of claim 1, wherein the at least one actuator comprises a monolithic crystal actuator.

4. The multi-dimensional standing wave probe of claim 3, wherein the monolithic crystal actuator comprises a crystal having zero grain boundaries.

5. The multi-dimensional standing wave probe of claim 3, wherein the monolithic crystal actuator comprises a plurality of thin flexure structures.

6. The multi-dimensional standing wave probe of claim 5, wherein the monolithic crystal actuator further comprises a plurality of metallic electrodes disposed on surfaces of the plurality of thin flexure structures.

7. The multi-dimensional standing wave probe of claim 3, wherein the monolithic crystal actuator is actuated such that it exhibits one of a static behavior, a resonant behavior, and a combination thereof.

8. The multi-dimensional standing wave probe of claim 1, wherein the amplitude of oscillation is varied in two or more dimensions to provide a virtual probe tip of different sizes and shapes in two or more dimensions.

9. The multi-dimensional standing wave probe of claim 1, wherein the amplitude of oscillation is varied in two or more dimensions to provide a virtual probe tip of different sensitivities in two or more dimensions.

10. A method for providing a multi-dimensional standing wave probe for microscale and nanoscale measurement, manipulation, and surface modification, comprising: providing a filament having a first free end and a second end that is attached to at least one actuator to apply oscillation cycles to the filament; wherein the oscillation of the filament during at least one complete cycle of oscillation of the at least one actuator causes the free end to move in a multi-dimensional envelope, producing a defined virtual probe tip at the free end, wherein a shape of the virtual probe tip is defined by both a characteristic shape of the oscillation of the free end and a geometry of the filament.

11. The method for providing a multi-dimensional standing wave probe of claim 10, wherein the multi-dimensional standing wave probe is operated in one of a linearly-driven mode, a rotationally-driven mode, and a combination thereof.

12. The method for providing a multi-dimensional standing wave probe of claim 10, wherein the at least one actuator comprises a monolithic crystal actuator.

13. The method for providing a multi-dimensional standing wave probe of claim 12, wherein the monolithic crystal actuator comprises a crystal having zero grain boundaries.

14. The method for providing a multi-dimensional standing wave probe of claim 12, wherein the monolithic crystal actuator comprises a plurality of thin flexure structures.

15. The method for providing a multi-dimensional standing wave probe of claim 14, wherein the monolithic crystal actuator further comprises a plurality of metallic electrodes disposed on surfaces of the plurality of thin flexure structures.

16. The method for providing a multi-dimensional standing wave probe of claim 10, wherein the amplitude of oscillation is varied in two or more dimensions to provide a virtual probe tip of different sizes and shapes in two or more dimensions.

17. The method for providing a multi-dimensional standing wave probe of claim 10, wherein the amplitude of oscillation is varied in two or more dimensions to provide a virtual probe tip of different sensitivities in two or more dimensions.

18. A multi-dimensional standing wave probe for microscale and nanoscale measurement, manipulation, and surface modification, comprising: a filament having a constrained end that is attached to at least one actuator to apply oscillation cycles to the filament; wherein the oscillation of the filament during at least one complete cycle of oscillation of the at least one actuator causes the filament to move in a multi-dimensional envelope, producing a defined virtual probe, wherein a shape of the virtual probe is defined by both a characteristic shape of the oscillation of the filament and a geometry of the filament.

* * * * *